(12) United States Patent
Pai et al.

(10) Patent No.: US 8,077,419 B1
(45) Date of Patent: Dec. 13, 2011

(54) METHOD AND APPARATUS FOR ADJUSTING A GAIN OF A VARIABLE GAIN AMPLIFIER IN A READ CHANNEL MODULE

(75) Inventors: Vasudev V. Pai, Santa Clara, CA (US); Toai Doan, Santa Clara, CA (US); Hongying Sheng, San Jose, CA (US)

(73) Assignee: Marvell International, Hamilton (BM)

( * ) Notice: Subject to any disclaimer, the term of this patent is extended or adjusted under 35 U.S.C. 154(b) by 0 days.

(21) Appl. No.: 12/906,886

(22) Filed: Oct. 18, 2010

Related U.S. Application Data

(63) Continuation of application No. 11/799,722, filed on May 2, 2007, now Pat. No. 7,817,366.

(60) Provisional application No. 60/798,852, filed on May 9, 2006.

(51) Int. Cl.
*G11B 5/35* (2006.01)

(52) U.S. Cl. .................. 360/65; 360/25; 360/39

(58) Field of Classification Search ........................ None
See application file for complete search history.

(56) References Cited

U.S. PATENT DOCUMENTS

| | | | | |
|---|---|---|---|---|
| 5,375,145 A * | 12/1994 | Abbott et al. | ................ | 375/345 |
| 5,422,601 A * | 6/1995 | Kovacs et al. | ................ | 330/279 |
| 5,422,760 A | 6/1995 | Abbott et al. | | |
| 5,552,942 A * | 9/1996 | Ziperovich et al. | ............. | 360/51 |
| 5,796,358 A * | 8/1998 | Shih et al. | ................ | 341/139 |
| 5,999,355 A * | 12/1999 | Behrens et al. | ................ | 360/65 |
| 6,208,481 B1 | 3/2001 | Spurbeck et al. | | |
| 6,268,974 B1 | 7/2001 | Sloan et al. | | |
| 6,307,696 B1 * | 10/2001 | Bishop et al. | ................ | 360/51 |
| 6,577,196 B2 * | 6/2003 | Hart | ................ | 330/279 |
| 6,587,529 B1 * | 7/2003 | Staszewski et al. | ........... | 375/371 |
| 6,801,380 B1 * | 10/2004 | Sutardja | ................ | 360/65 |
| 6,819,514 B1 * | 11/2004 | Behrens et al. | ................ | 360/65 |
| 6,930,553 B2 * | 8/2005 | Takahashi | ................ | 330/279 |
| 7,054,088 B2 | 5/2006 | Yamazaki et al. | | |
| 7,072,130 B2 | 7/2006 | Annampedu | | |
| 7,295,073 B2 * | 11/2007 | Hsieh et al. | ................ | 330/279 |
| 7,440,208 B1 | 10/2008 | McEwen et al. | | |
| 7,579,970 B2 * | 8/2009 | Seo et al. | ................ | 341/118 |
| 7,589,927 B2 * | 9/2009 | Hutchins et al. | ................ | 360/65 |
| 7,773,324 B2 * | 8/2010 | Ozdemir | ................ | 360/51 |
| 2006/0132953 A1 * | 6/2006 | Asakura et al. | ................ | 360/48 |
| 2007/0040610 A1 * | 2/2007 | Kwon et al. | ................ | 330/140 |

* cited by examiner

*Primary Examiner* — Dismery Mercedes

(57) ABSTRACT

A read-channel module including a VGA module to amplify a signal based on a variable gain, an ADC module to generate a sample based on the amplified signal, and an AGC module to control the variable gain of the VGA module. A gain adjusting module generates (i) a first gain and (ii) a second gain when an amplitude of the sample is (i) less than or equal to a first predetermined threshold and (ii) greater than or equal to a second predetermined threshold, respectively. The AGC module (i) increases and (ii) decreases the variable gain of the VGA module based on (i) the first gain and (ii) the second gain, respectively. The gain adjusting module generates the first gain and the second gain by (i) multiplying a present gain of the AGC module by a predetermined multiplier or (ii) adding a predetermined offset to the present gain.

10 Claims, 9 Drawing Sheets

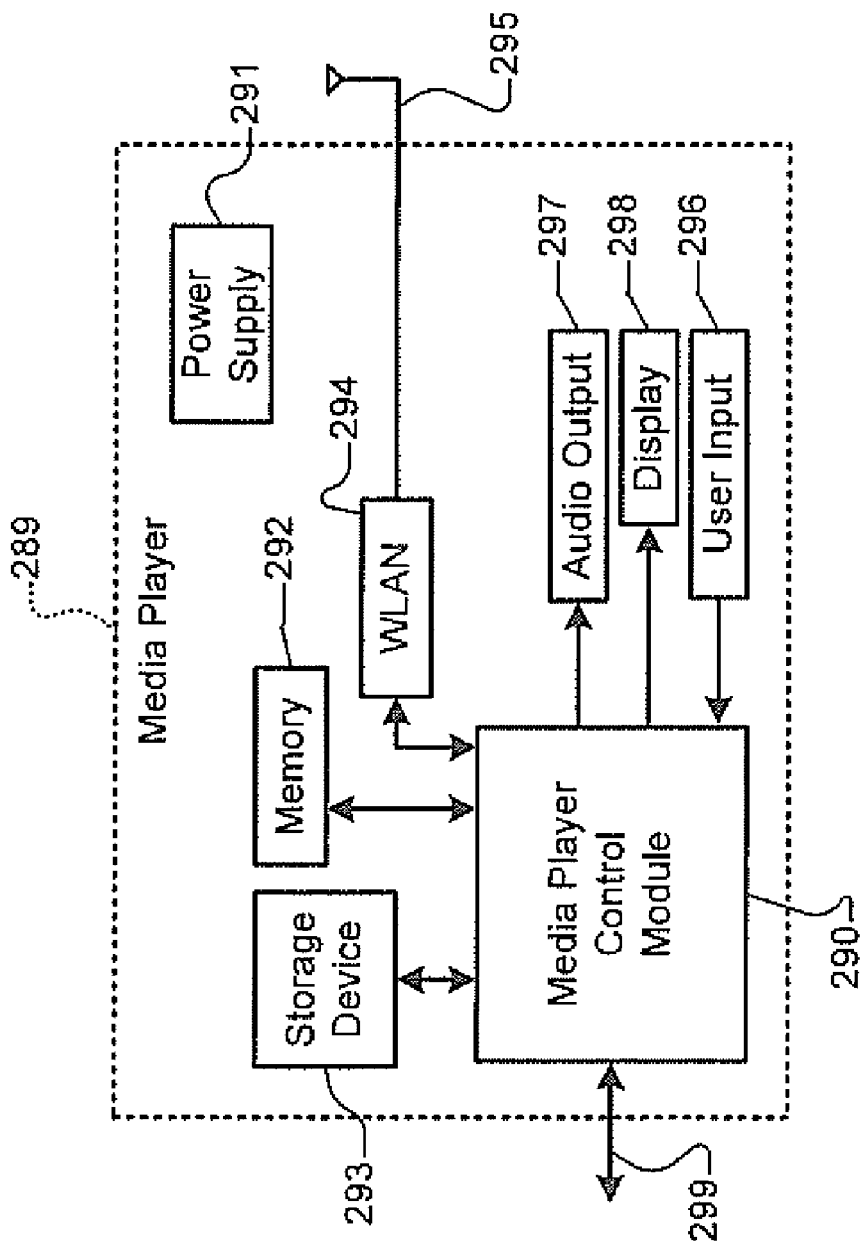

METHOD AND APPARATUS FOR ADJUSTING A GAIN OF A VARIABLE GAIN AMPLIFIER IN A READ CHANNEL MODULE

CROSS-REFERENCE TO RELATED APPLICATIONS

This application is a continuation of U.S. application Ser. No. 11/799,722 (now U.S. Pat. No. 7,817,366), filed on May 2, 2007, which claims the benefit of U.S. Provisional Application No. 60/798,852, filed on May 9, 2006. The disclosures of the applications referenced above are incorporated herein by reference in their entirety.

FIELD

The present disclosure relates to disk drives and more particularly to timing recovery in read channels.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a hard disk drive (HDD) 10 includes a hard disk assembly (HDA) 12 and a HDD printed circuit board (PCB) 14. The HDA 12 includes one or more circular platters 16, which have magnetic surfaces that are used to store data magnetically. Data is stored in binary form as a magnetic field of either positive or negative polarity. The platters 16 are arranged in a stack, and the stack is rotated by a spindle motor 18. At least one read/write head (hereinafter, "head") 20 reads data from and writes data on the magnetic surfaces of the platters 16.

Each head 20 includes a write element, such as an inductor, that generates a magnetic field and a read element, such as a magneto-resistive (MR) element, that senses the magnetic field on the platter 16. The head 20 is mounted at a distal end of an actuator arm 22. An actuator, such as a voice coil motor (VCM) 24, moves the actuator arm 22 relative to the platters 16.

The HDA 12 includes a preamplifier device 26 that amplifies signals received from and sent to the head 20. When writing data, the preamplifier device 26 generates a write current that flows through the write element of the head 20. The write current is switched to produce a positive or negative magnetic field on the magnetic surfaces of the platters 16. When reading data, the magnetic fields stored on the magnetic surfaces of the platters 16 induce low-level analog signals in the read element of the head 20. The preamplifier device 26 amplifies the low-level analog signals and outputs amplified analog signals to a read/write channel (hereinafter, "read-channel") module 28.

The HDD PCB 14 includes the read-channel module 28, a hard disk controller (HDC) module 30, a processor 32, a spindle/VCM driver module 34, volatile memory 36, non-volatile memory 38, and an input/output (I/O) interface 40. During write operations, the read-channel module 28 may encode the data to increase reliability by using error-correcting codes (ECC) such as run length limited (RLL) code, Reed-Solomon code, etc. The read-channel module 28 then transmits the encoded data to the preamplifier device 26. During read operations, the read-channel module 28 receives analog signals from the preamplifier device 26. The read-channel module 28 converts the analog signals into digital signals, which are decoded to recover the original data.

The HDC module 30 controls operation of the HDD 10. For example, the HDC module 30 generates commands that control the speed of the spindle motor 18 and the movement of the actuator arm 22. The spindle/VCM driver module 34 implements the commands and generates control signals that control the speed of the spindle motor 18 and the positioning of the actuator arm 22. Additionally, the HDC module 30 communicates with an external device (not shown), such as a host adapter within a host device, via the I/O interface 40. The HDC module 30 may receive data to be stored from the external device, and may transmit retrieved data to the external device.

The processor 32 processes data, including encoding, decoding, filtering, and/or formatting. Additionally, the processor 32 processes servo or positioning information to position the heads 20 over the platters 16 during read/write operations. Servo, which is stored on the platters 16, ensures that data is written to and read from correct locations on the platters 16. In some implementations, a self-servo write (SSW) module 42 may write servo on the platters 16 using the heads 20 prior to storing data on the HDD 10.

Timing recovery in the read-channel module 28 begins with zero phase start (ZPS). ZPS includes calculating phase information. The phase information enables timing recovery to begin data-acquisition with minimum phase-error.

Referring now to FIG. 2, the read-channel module 28 may comprise an input module 52, a variable-gain amplifier (VGA) module 54, a filter module 56, an analog-to-digital converter (ADC) module 58, a zero phase start (ZPS) module 60, a timing recovery module 62, and an automatic gain control (AGC) module 64.

The input module 52 receives read signals generated by heads 20. The VGA module 54 amplifies the read signals. The filter module 56 filters the amplified read signals. The ADC module 58 converts the amplified and filtered read signals from analog to digital format and generates samples.

The ZPS module 60 calculates phase information from the samples. Based on the phase information, the timing recovery module 62 determines when the phase error in the samples is minimum. That is, the timing recovery module 62 determines the time at which data may be correctly recovered from the -output of the ADC module 58 with minimum phase-error.

Additionally, the ZPS module 60 controls the gain of the AGC module 64. The AGC module 64, in turn, controls the gain of the VGA module 54. The gain of the VGA module 54 determines the amplitude of the output of the ADC module 58. For example, if the gain of the VGA module 54 is very high, the output of the ADC module 58 may be saturated. In that case, the ZPS module 60 may generate incorrect phase information. On the other hand, if the gain of the VGA module 54 is very low, the output of the ADC module 58 may be very low, and the ZPS module 60 may be unable to detect phase information.

In either case, the timing recovery module 62 may be unable to determine the time at which data may be correctly recovered from the output of the ADC module 58 with minimum phase-error. Consequently, data may be recovered from the output of the ADC module 58 at incorrect times, and the data thus recovered may be incorrect.

SUMMARY

A read-channel module including an amplifier having a gain, wherein the amplifier is configured to generate amplified signals based on the gain. The read channel module further includes an analog-to-digital converter (ADC) configured to convert the amplified signals to digital samples; an amplitude measuring module configured to measure amplitudes of the digital samples; and a gain adjusting module configured to adjust the gain of the amplifier based on the amplitudes of the digital samples, wherein the gain adjusting module adjusts the gain of the amplifier to in response to the amplitudes of the digital samples being outside a predetermined range of values.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 6F is a functional block diagram of a media player.

DETAILED DESCRIPTION

Figure 1:
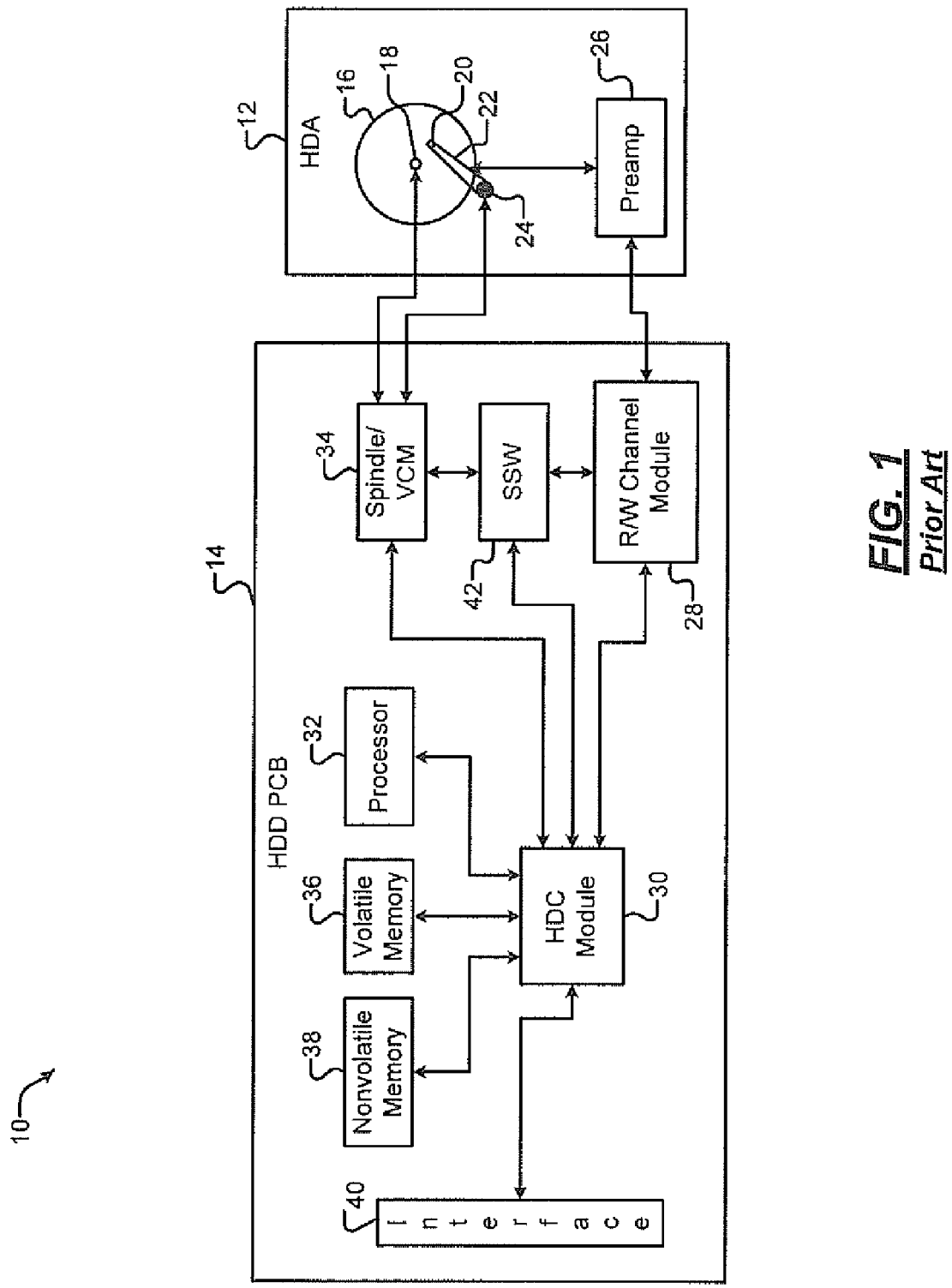
FIG. 1 is a functional block diagram of a disk drive.
Figure 2:
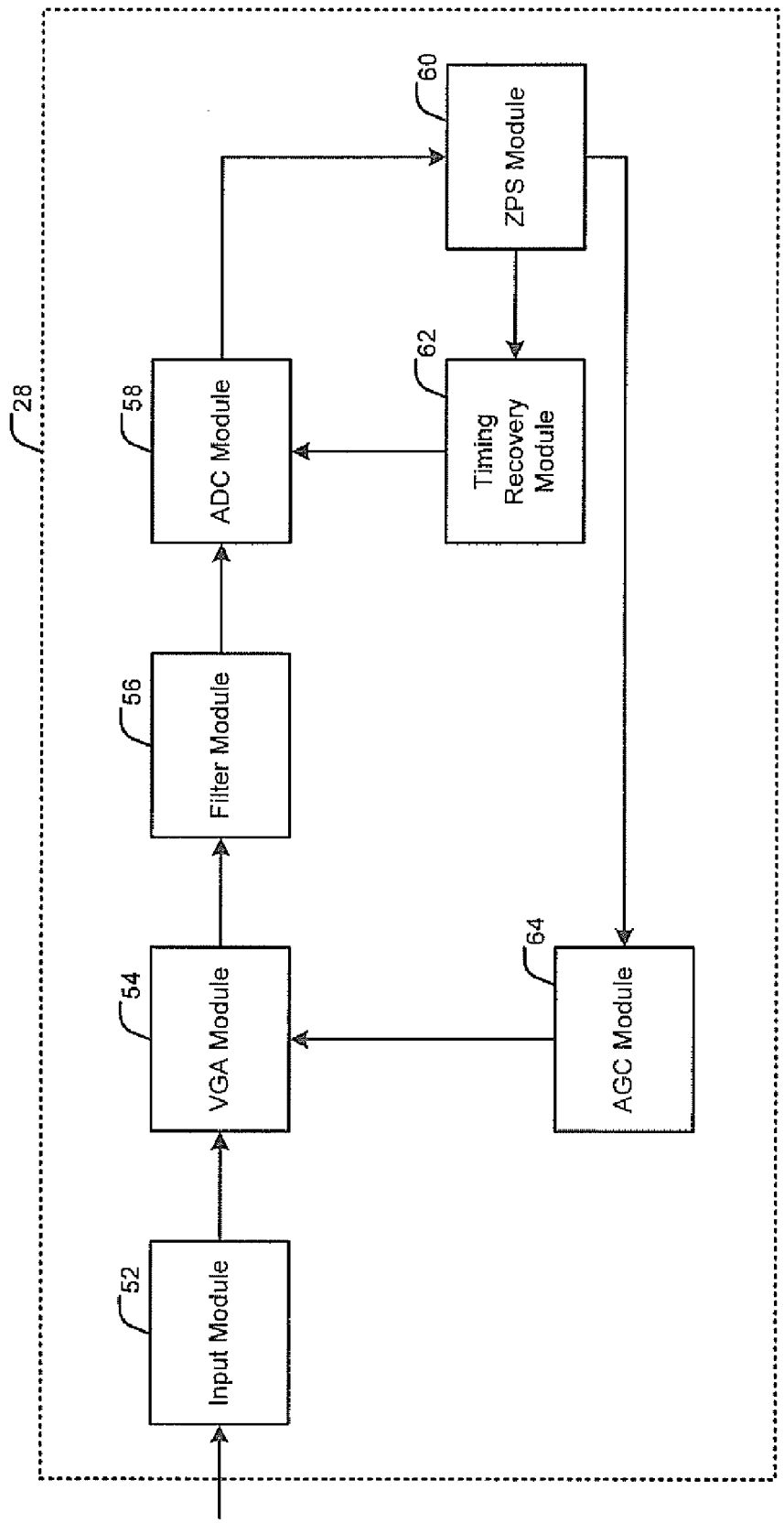
FIG. 2 is a functional block diagram of a read-channel module of a disk drive according to the prior art.

The following description is merely exemplary in nature and is in no way intended to limit the disclosure, its application, or uses. For purposes of clarity, the same reference numbers will be used in the drawings to identify similar elements. As used herein, the term module, circuit, and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Gain of a variable-gain amplifier (VGA) in a read-channel module of a hard disk drive (HDD) may be controlled in a manner that prevents an analog-to-digital converter (ADC) module from going into saturation and from generating a very low output. Thus, a zero phase start (ZPS) module in the read-channel module can generate correct phase information from samples generated by the ADC module. Consequently, a timing recovery module in the read-channel module may begin data-acquisition when phase-error in the samples is minimum. That is, the timing recovery module may recover data from the output of the ADC module at correct time.

Figure 3:
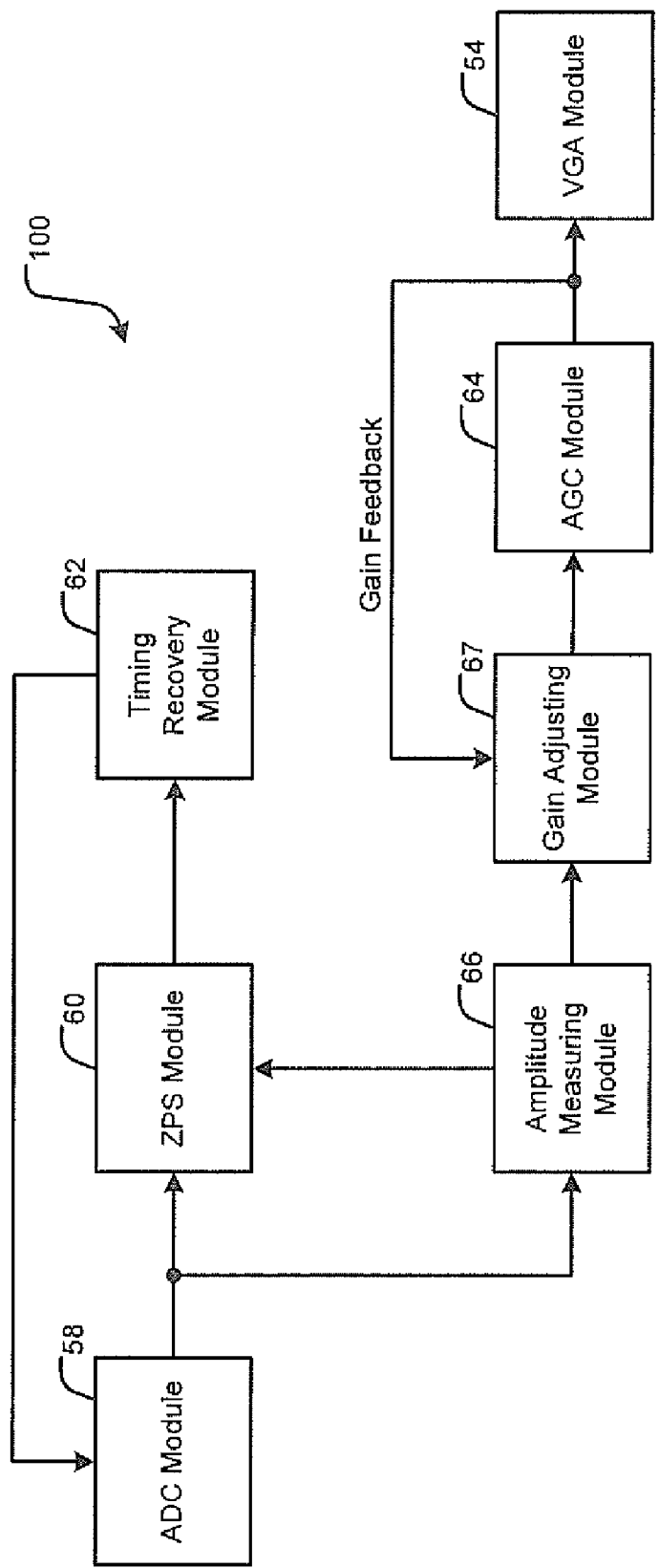
FIG. 3 is a functional block diagram of an exemplary system for controlling gain of a variable-gain amplifier in a read-channel module according to the present disclosure.

Referring now to FIG. 3, a system 100 for controlling the gain of a VGA module in a read-channel module of a hard disk drive comprises a VGA module 54, an ADC module 58, a ZPS module 60, a timing recovery module 62, an automatic gain control (AGC) module 64, an amplitude measuring module 66, and a gain adjusting module 67. The read-channel module receives input signals generated by read/write heads (not shown). The VGA module 54 amplifies the input signals and generates amplified signals. A filter module (not shown) may filter the amplified signals and output filtered signals to the ADC module 58.

The ADC module 58 communicates with the VGA module 54 or the filter module. The ADC module 58 converts signals received from the VGA module 54 or the filter module from analog to digital format and generates samples. The ZPS module 60 calculates phase information from the samples. Based on the phase information, the timing recovery module 62 determines when a phase-error in the samples is minimum. That is, the timing recovery module 62 determines the time at which data may be correctly recovered from the samples.

The gain of the VGA module 54 determines the amplitude of the samples. The amplitude measuring module 66 measures the amplitude of the samples and determines when the ADC module 58 is either saturated or when the amplitude of the samples is less than a predetermined threshold. In either case, the amplitude measuring module 66 disables the ZPS module 60 and enables the gain adjusting module 67.

The gain adjusting module 67 calculates a new gain for the AGC module 64. The AGC module 64 uses the new gain to adjust the gain of the VGA module 58 such that the ADC module 58 is neither saturated nor very low. After the gain of the VGA module 54 settles, the amplitude measuring module 66 enables the ZPS module 60. The ADC module 58 generates samples of sufficient amplitude to enable the ZPS module 60 to correctly calculate phase information from the samples. Based on the phase information, the timing recovery module 62 correctly determines the time at which data may be recovered with minimum phase-error from the samples.

Specifically, the amplitude measuring module 66 receives N samples from the ADC module 58, where N is a predetermined integer that is greater than 1. The amplitude measuring module 66 measures the amplitudes of the N samples. When the gain of the VGA module 54 is very high, the output of the ADC module 58 may be saturated. That is, at least one of the samples may have amplitude greater than or equal to a predetermined maximum amplitude called ADC-max. Alternatively, at least one of the samples may have amplitude less than or equal to a predetermined minimum amplitude called ADC-min. ADC-max and ADC-min may be programmable.

In either case, the amplitude measuring module 66 generates a control signal indicating that the ADC module 58 is saturated. In other words, the amplitude measuring module 66 generates the control signal when (((Sample-1=ADC-max) OR (Sample-1=ADC-min)) OR ((Sample-2=ADC-max) OR (Sample-2=ADC-min)) . . . ((Sample-N=ADC-max) OR (Sample-N=ADC-min))). Alternatively, the amplitude measuring module 66 may generate the control signal when S of N samples have amplitudes equal to ADC-max or ADC-min, where $1 \leq S \leq N$.

The control signal disables the ZPS module 60. That is, the control signal aborts or suspends a present ZPS operation.

Additionally, the control signal enables the gain adjusting module 67. The gain adjusting module 67 calculates a new gain that is less than the present gain of the AGC module 64 and inputs the new gain to the AGC module 64. The AGC module 64, in turn, decreases the gain of the VGA module 54 based on the new gain.

The gain adjusting module 67 calculates the new gain as follows. The present gain of the AGC module 64 during the present ZPS operation is fed back to the gain adjusting module 67. The gain adjusting module 67 multiples the present gain by a predetermined scale-down factor to generate the new gain. The scale-down factor may be a binary number that represents a fraction (i.e., a decimal number between 0 and 1). For example, if a binary number 00 represents an integer 1, then a binary number 01 may represent a fraction 0.875, a binary number 10 may represent a fraction 0.75, and a binary number 11 may represent a fraction 0.5. The number of binary digits and the values of the fraction represented by the binary numbers may vary.

Alternatively, the gain adjusting module 67 may subtract a predetermined gain-offset from the current gain to generate the new gain. Depending on a programmable setting, the gain adjusting module 67 may calculate the new gain by multiplying the present gain by the scale-down factor or by subtracting the gain-offset from the present gain. Thus, the gain adjusting module 67 may decrease the gain of the AGC module 64 and the VGA module 54 when the ADC module 58 is saturated.

The amplitude measuring module 66 waits for a predetermined time for the gain of the VGA module 54 to settle. The predetermined time may include a pre-programmed minimum time plus a programmable time. The predetermined time may be equal to a period of a predetermined number of clock cycles. Thus, the predetermined time may include a minimum time equal to a period of a fixed number of clock cycles plus time equal to a period of a programmable number of clock cycles. After the predetermined time, the amplitude measuring module 66 enables the ZPS module 60, and the ZPS module 60 begins a new ZPS operation.

Depending on the value of the new gain, the amplitude of the samples generated by the ADC module 58 in the new ZPS operation may be less than the amplitude of the samples generated by the ADC module 58 in the present operation. The ZPS module 60 may generate correct phase information from the new samples generated by the ADC module 58.

On the other hand, the amplitude measuring module 66 may find that absolute values of amplitudes of all of the N samples are less than or equal to a predetermined threshold value called a ZPS input threshold (ZPS-in-threshold). In that case, the amplitude measuring module 66 determines that the output of the ADC module 58 is very low and generates a control signal. In other words, the amplitude measuring module 66 generates the control signal when ((|Sample-1|≦ZPS-in-threshold AND |Sample-2|≦ZPS-in-threshold AND . . . |Sample-N|≦ZPS-in-threshold), where |Sample-N| denotes an absolute value of the sample N. The ZPS module 60 cannot correctly detect the phase information from the samples when the amplitudes of samples are less than ZPS-in-threshold. The ZPS-in-threshold value may be programmable.

The control signal disables the ZPS module 60. That is, the control signal aborts or suspends the present ZPS operation. Additionally, the control signal enables the gain adjusting module 67. The gain adjusting module 67 calculates a new gain that is greater than the present gain of the AGC module 64 and inputs the new gain to the AGC module 64. The AGC module 64, in turn, increases the gain of the VGA module 54 based on the new gain.

The gain adjusting module 67 calculates the new gain as follows. The present gain of the AGC module 64 during the present ZPS operation is fed back to the gain adjusting module 67. The gain adjusting module 67 multiplies the present gain by a predetermined scale-up multiplier to generate the new gain. The scale-up multiplier may be a binary number that represents a decimal number greater than 1. For example, if a binary number 00 represents the integer 1, then a binary number 01 may represent a multiplier 1.125, a binary number 10 may represent a multiplier 1.25, and a binary number 11 may represent a multiplier 1.5. The number of binary digits and the values of the multiplier represented by the binary numbers may vary.

Alternatively, the gain adjusting module 67 adds a predetermined gain-offset to the present gain to generate the new gain. Depending on a programmable setting, the gain adjusting module 67 may calculate the new gain by multiplying the present gain by the scale-up factor or by adding the gain-offset to the present gain. Thus, the gain adjusting module 67 may increase the gain of the AGC module 64 and the VGA module 54 when the ADC module 58 is very low.

The amplitude measuring module 66 waits for a predetermined time for the gain of the VGA module 54 to settle. The predetermined time may include a pre-programmed minimum time plus a programmable time. The predetermined time may be equal to a period of a predetermined number of clock cycles. Thus, the predetermined time may include a minimum time equal to a period of a fixed number of clock cycles plus time equal to a period of a programmable number of clock cycles. After the predetermined time, the amplitude measuring module 66 enables the ZPS module 60, and the ZPS module 60 begins a new ZPS operation.

Depending on the value of the new gain, the absolute values of the amplitudes of the samples generated by the ADC module 58 in the new ZPS operation may be greater than the absolute values of the amplitudes of the samples in the present operation. Thus, the ZPS module 60 may generate correct phase information from the new samples generated by the ADC module 58.

Figure 4:
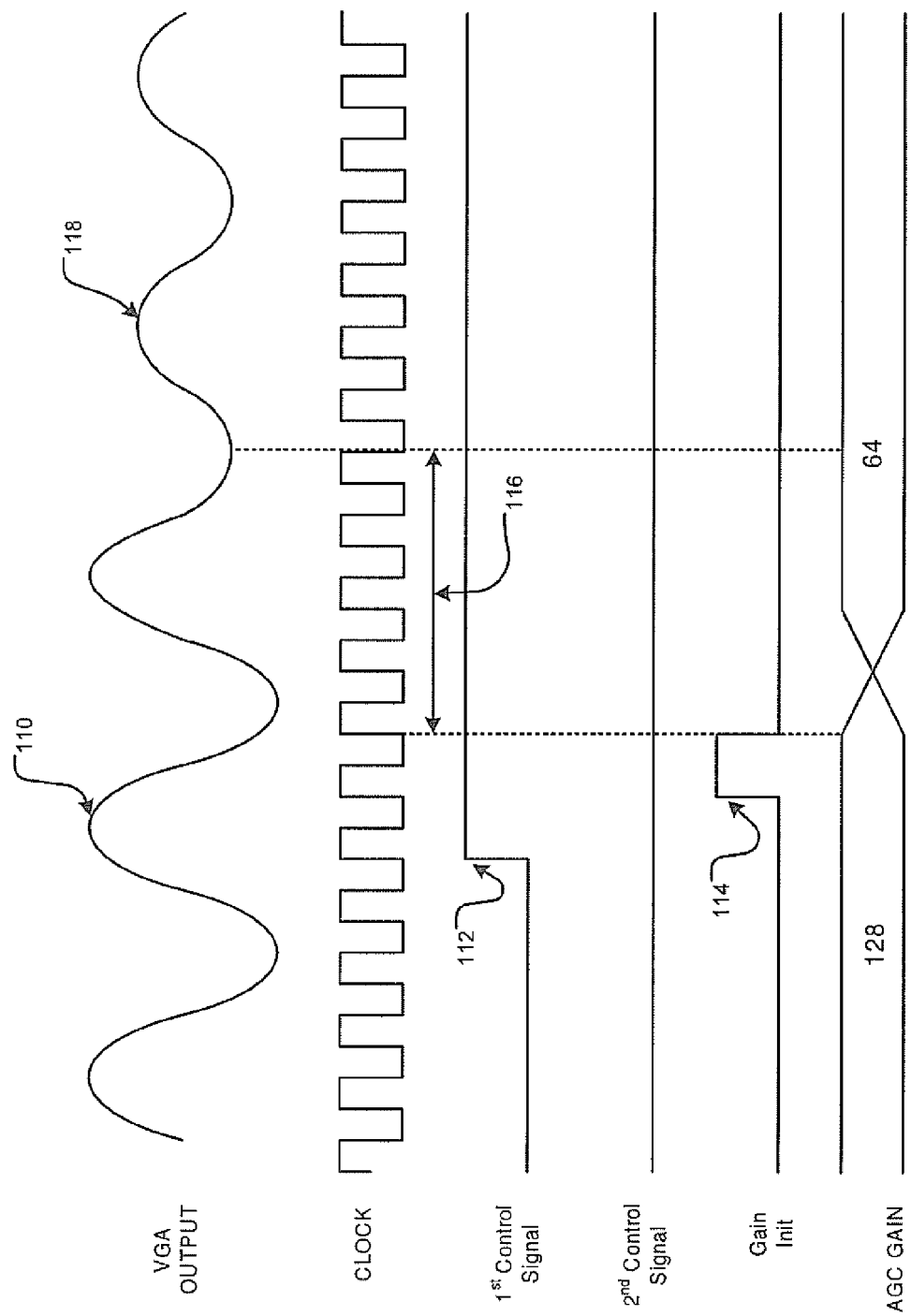
FIG. 4 illustrates timing of various signals when the system of FIG. 3 detects saturation of an analog-to-digital converter (ADC) module in the read-channel module according to the present disclosure.

FIG. 4 shows an exemplary operation of the system 100 when the ADC module 58 is saturated. The gain of the VGA module 54 is very high as shown by the output of the VGA module 54 at 110. The amplitude measuring module 66 generates the first control signal as shown at 112. The gain adjusting module 67 inputs the new gain (e.g., new gain equal to 64) to the AGC module 64 as shown at 114. The amplitude measuring module 66 waits for a predetermined number of clock cycles as shown at 116 until the gain of the VGA module 54 settles as shown by the output of the VGA module 54 at 118.

Figure 5:
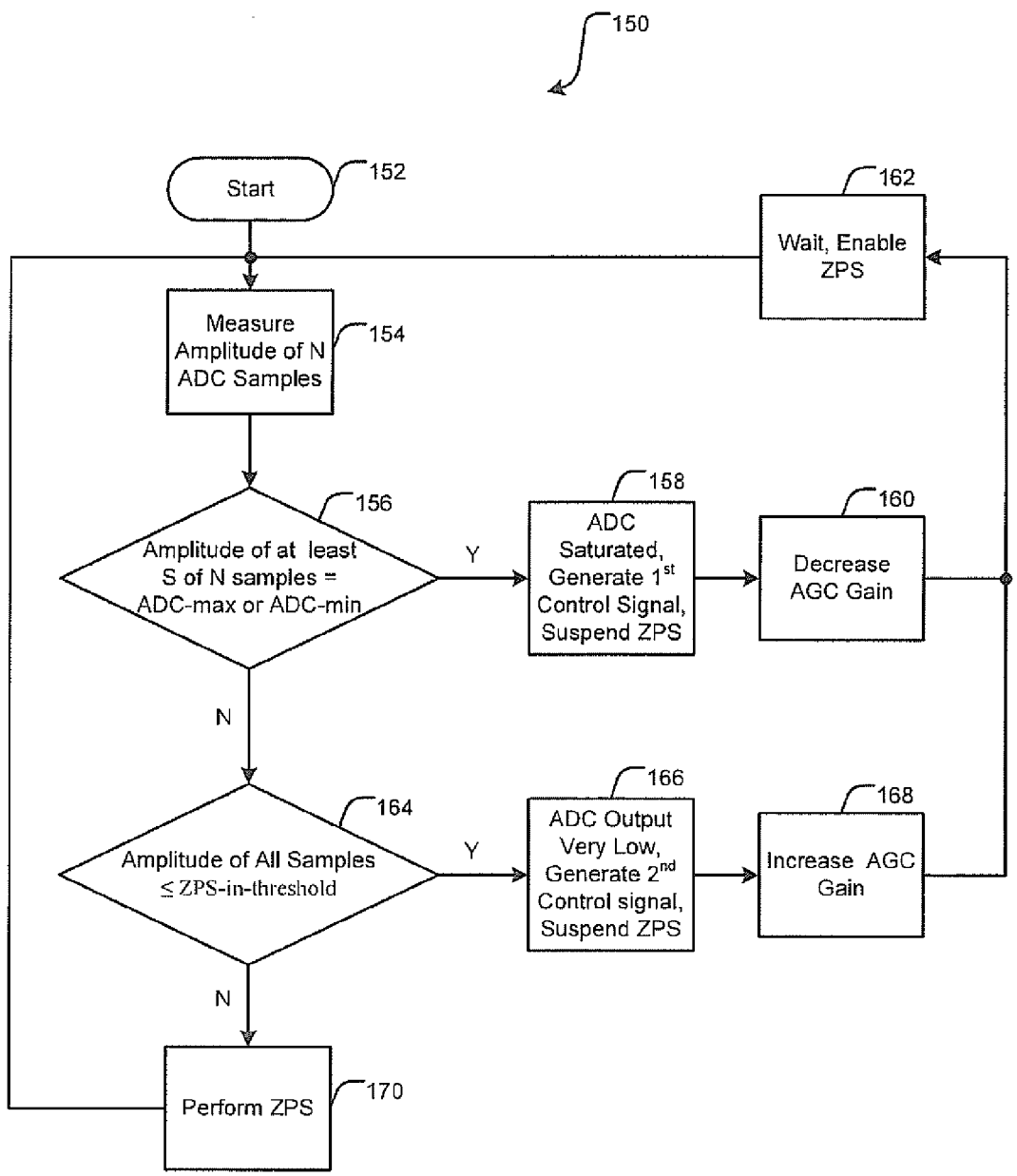
FIG. 5 is a flowchart of an exemplary method for controlling gain of a variable-gain amplifier in a read-channel module according to the present disclosure.

Referring now to FIG. 5, a method 150 for controlling the gain of a VGA module in a read-channel module of a disk drive begins at step 152. In step 154, an amplitude measuring module 66 measures amplitudes of N samples generated by an ADC module 58. The amplitude measuring module 66 determines in step 154 whether amplitude of at least one of the N samples (e.g., amplitude of S samples, where 1≦S≦N) is equal to ADC-max or ADC-min. If true, the amplitude measuring module 66 determines that the ADC module 58 is saturated, generates a control signal and suspends a present ZPS operation in step 158.

In step 160, the gain adjusting module 67 calculates a new gain by multiplying a present gain of an AGC module 64 by a predetermined scale-down factor or by subtracting a predetermined gain-offset from the present gain and inputs the new gain to the AGC module 64. In step 162, the amplitude measuring module 66 waits for a predetermined time until the gain of a VGA module 54 settles, enables the ZPS module 60, and the method 150 returns to step 154.

If false, however, the amplitude measuring module 66 determines in step 164 whether absolute values of amplitudes of all the predetermined samples are less than or equal to a predetermined threshold called ZPS-in-threshold since a ZPS module 60 can perform ZPS only if the absolute values of the amplitudes are greater than ZPS-in-threshold. If true, the amplitude measuring module 66 determines that the output of the ADC module 58 is very low, generates a control signal, and suspends the present ZPS operation in step 166.

In step 168, the gain adjusting module 67 calculates a new gain by multiplying the present gain of the AGC module 64 by a predetermined scale-up multiplier or by adding a predetermined gain-offset to the present gain and inputs the new gain to the AGC module 64. In step 162, the amplitude measuring module 66 waits for a predetermined time until the gain of the VGA module 54 settles, enables the ZPS module 60, and the method 150 returns to step 154. If false, however, the ZPS module 60 performs ZPS in step 170, and the method 150 returns to step 154.

Figure 6A:
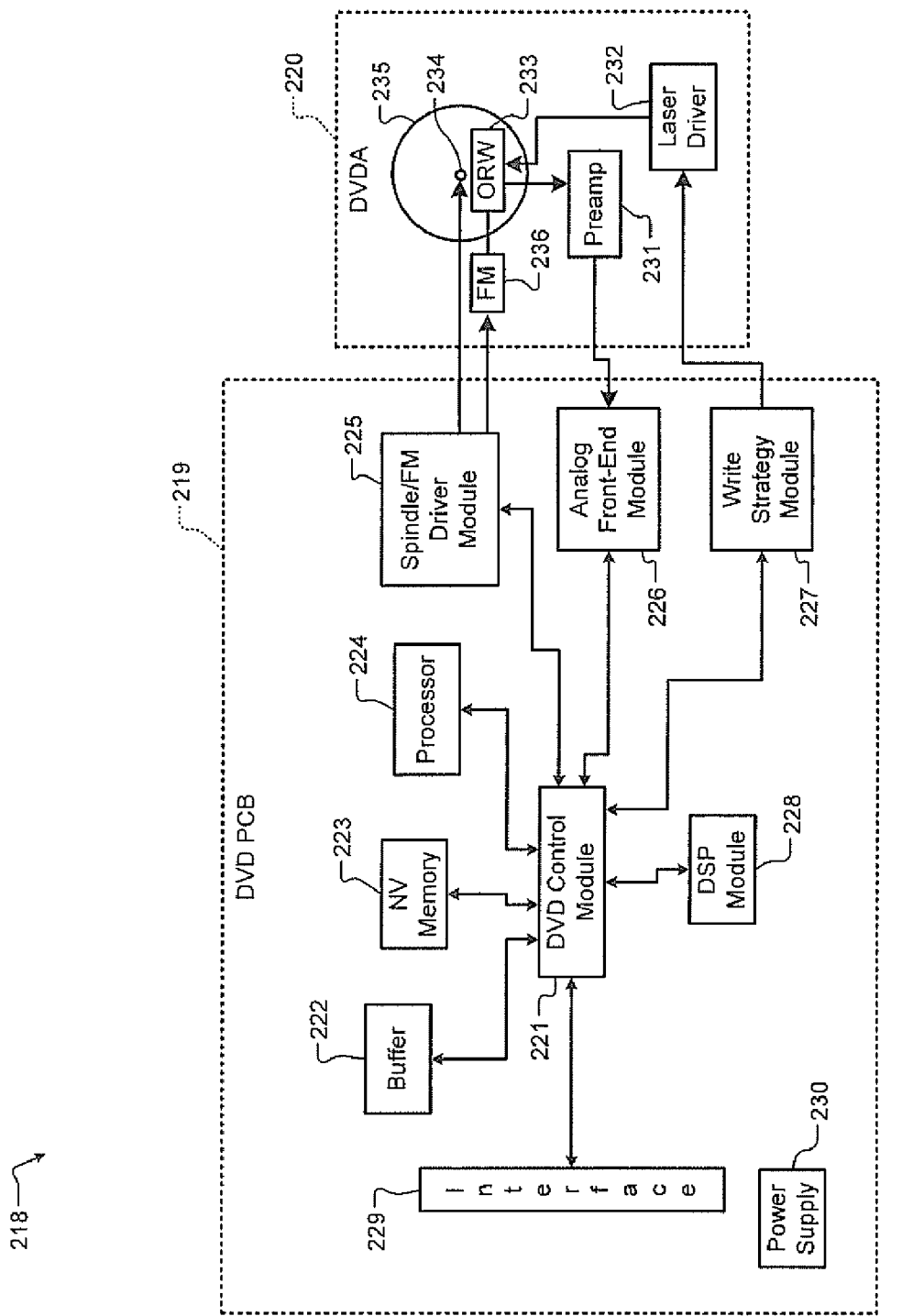
FIG. 6A is a functional block diagram of a DVD drive.

Referring now to FIGS. 6A-6F, various exemplary implementations incorporating the teachings of the present disclosure are shown. Referring now to FIG. 6A, the teachings of the disclosure can be implemented in an analog front-end module 226 of a DVD drive 218 or of a CD drive (not shown). The DVD drive 218 includes a DVD PCB 219 and a DVD assembly (DVDA) 220. The DVD PCB 219 includes a DVD control module 221, a buffer 222, nonvolatile memory 223, a processor 224, a spindle/FM (feed motor) driver module 225, the analog front-end module 226, a write strategy module 227, and a DSP module 228.

The DVD control module 221 controls components of the DVDA 220 and communicates with an external device (not shown) via an I/O interface 229. The external device may include a computer, a multimedia device, a mobile computing device, etc. The I/O interface 229 may include wireline and/or wireless communication links.

The DVD control module 221 may receive data from the buffer 222, nonvolatile memory 223, the processor 224, the spindle/FM driver module 225, the analog front-end module 226, the write strategy module 227, the DSP module 228, and/or the I/O interface 229. The processor 224 may process the data, including encoding, decoding, filtering, and/or formatting. The DSP module 228 performs signal processing, such as video and/or audio coding/decoding. The processed data may be output to the buffer 222, nonvolatile memory 223, the processor 224, the spindle/FM driver module 225, the analog front-end module 226, the write strategy module 227, the DSP module 228, and/or the I/O interface 229.

The DVD control module 221 may use the buffer 222 and/or nonvolatile memory 223 to store data related to the control and operation of the DVD drive 218. The buffer 222 may include DRAM, SDRAM, etc. The nonvolatile memory 223 may include flash memory (including NAND and NOR flash memory), phase change memory, magnetic RAM, or multi-state memory, in which each memory cell has more than two states. The DVD PCB 219 includes a power supply 230 that provides power to the components of the DVD drive 218.

The DVDA 220 may include a preamplifier device 231, a laser driver 232, and an optical device 233, which may be an optical read/write (ORW) device or an optical read-only (OR) device. A spindle motor 234 rotates an optical storage medium 235, and a feed motor 236 actuates the optical device 233 relative to the optical storage medium 235.

When reading data from the optical storage medium 235, the laser driver provides a read power to the optical device 233. The optical device 233 detects data from the optical storage medium 235, and transmits the data to the preamplifier device 231. The analog front-end module 226 receives data from the preamplifier device 231 and performs such functions as filtering and A/D conversion. To write to the optical storage medium 235, the write strategy module 227 transmits power level and timing data to the laser driver 232. The laser-driver 232 controls the optical device 233 to write data to the optical storage medium 235.

Figure 6C:
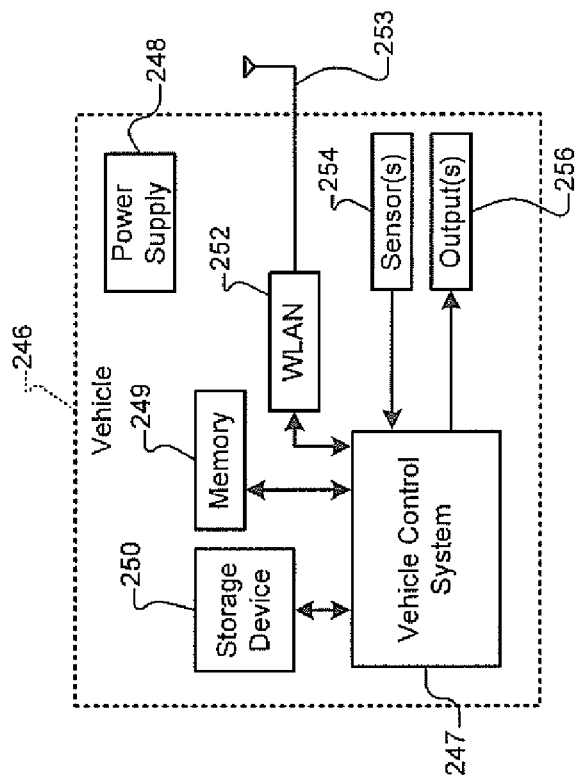
FIG. 6C is a functional block diagram of a vehicle control system.
Figure 6B:
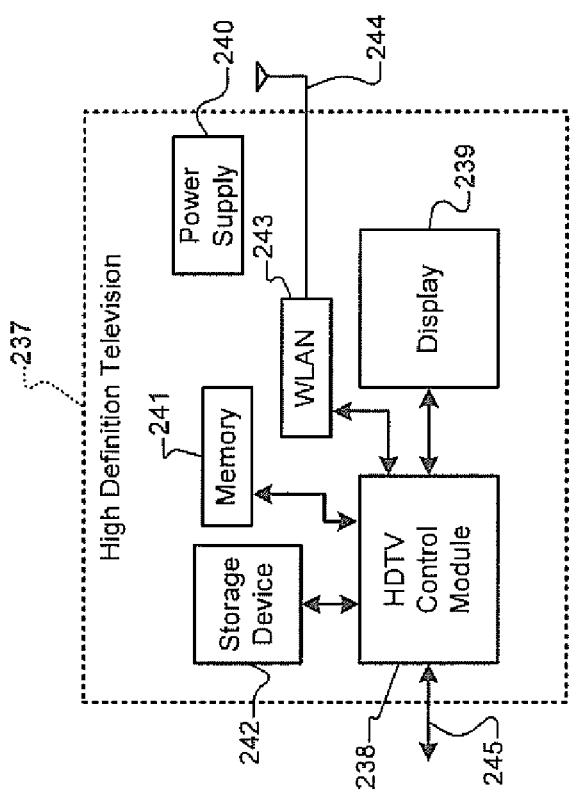
FIG. 6B is a functional block diagram of a high definition television.

Referring now to FIG. 6B, the teachings of the disclosure can be implemented in a hard disk drive (HDD) used as a storage device 242 in a high definition television (HDTV) 237. The HDTV 237 includes a HDTV control module 238, a display 239, a power supply 240, memory 241, the storage device 242, a WLAN interface 243 and associated antenna 244, and an external interface 245.

The HDTV 237 can receive input signals from the WLAN interface 243 and/or the external interface 245, which sends and receives information via cable, broadband Internet, and/or satellite. The HDTV control module 238 may process the input signals, including encoding, decoding, filtering, and/or formatting, and generate output signals. The output signals may be communicated to one or more of the display 239, memory 241, the storage device 242, the WLAN interface 243, and the external interface 245.

Memory 241 may include random access memory (RAM) and/or nonvolatile memory such as flash memory, phase change memory, or multi-state memory, in which each memory cell has more than two states. The storage device 242 may include an optical storage drive, such as a DVD drive, and/or the HDD. The HDTV control module 238 communicates externally via the WLAN interface 243 and/or the external interface 245. The power supply 240 provides power to the components of the HDTV 237.

Referring now to FIG. 6C, the teachings of the disclosure may be implemented in a hard disk drive (HDD) used as a storage device 250 in a vehicle 246. The vehicle 246 may include a vehicle control system 247, a power supply 248, memory 249, the storage device 250, and a WLAN interface 252 and associated antenna 253. The vehicle control system 247 may be a powertrain control system, a body control system, an entertainment control system, an anti-lock braking system (ABS), a navigation system, a telematics system, a lane departure system, an adaptive cruise control system, etc.

The vehicle control system 247 may communicate with one or more sensors 254 and generate one or more output signals 256. The sensors 254 may include temperature sensors, acceleration sensors, pressure sensors, rotational sensors, airflow sensors, etc. The output signals 256 may control engine operating parameters, transmission operating parameters, suspension parameters, etc.

The power supply 248 provides power to the components of the vehicle 246. The vehicle control system 247 may store data in memory 249 and/or the storage device 250. Memory 249 may include random access memory (RAM) and/or nonvolatile memory such as flash memory, phase change memory, or multi-state memory, in which each memory cell has more than two states. The storage device 250 may include an optical storage drive, such as a DVD drive, and/or the HDD. The vehicle control system 247 may communicate externally using the WLAN interface 252.

Figure 6E:
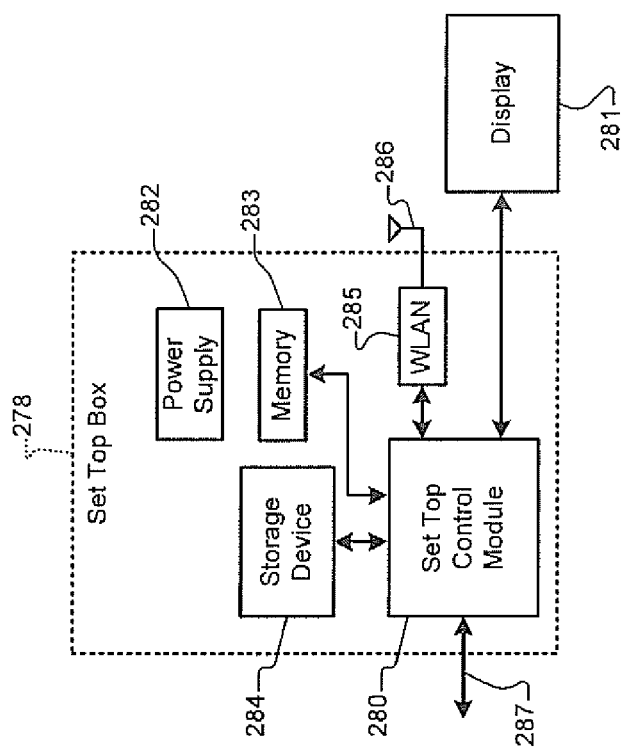
FIG. 6E is a functional block diagram of a set top box.
Figure 6D:
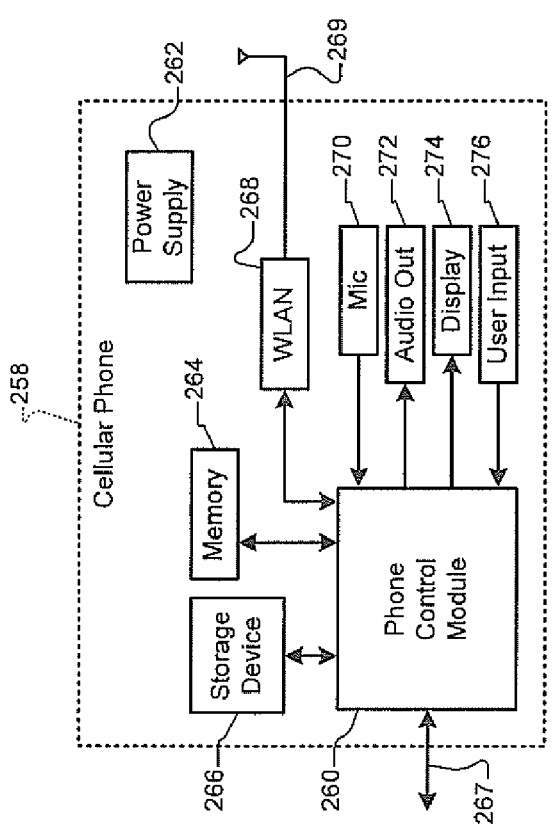
FIG. 6D is a functional block diagram of a cellular phone.

Referring now to FIG. 6D, the teachings of the disclosure can be implemented in a hard disk drive (HDD) used as a storage device 266 in a cellular phone 258. The cellular phone 258 includes a phone control module 260, a power supply 262, memory 264, the storage device 266, and a cellular network interface 267. The cellular phone 258 may include a WLAN interface 268 and associated antenna 269, a microphone 270, an audio output 272 such as a speaker and/or output jack, a display 274, and a user input device 276 such as a keypad and/or pointing device.

The phone control module 260 may receive input signals from the cellular network interface 267, the WLAN interface 268, the microphone 270, and/or the user input device 276. The phone control module 260 may process signals, including encoding, decoding, filtering, and/or formatting, and generate output signals. The output signals may be communicated to one or more of memory 264, the storage device 266, the cellular network interface 267, the WLAN interface 268, and the audio output 272.

Memory 264 may include random access memory (RAM) and/or nonvolatile memory such as flash memory, phase change memory, or multi-state memory, in which each memory cell has more than two states. The storage device 266 may include an optical storage drive, such as a DVD drive, and/or the HDD. The power supply 262 provides power to the components of the cellular phone 258.

Referring now to FIG. 6E, the teachings of the disclosure can be implemented in a hard disk drive (HDD) used as a storage device 284 in a -set top box 278. The set top box 278 includes a set top control module 280, a display 281, a power supply 282, memory 283, the storage device 284, and a WLAN interface 285 and associated antenna 286.

The set top control module 280 may receive input signals from the WLAN interface 285 and an external interface 287, which can send and receive information via cable, broadband Internet, and/or satellite. The set top control module 280 may process signals, including encoding, decoding, filtering, and/or formatting, and generate output signals. The output signals may include audio and/or video signals in standard and/or high definition formats. The output signals may be communicated to the WLAN interface 285 and/or to the display 281. The display 281 may include a television, a projector, and/or a monitor.

The power supply 282 provides power to the components of the set top box 278. Memory 283 may include random access memory (RAM) and/or nonvolatile memory such as flash memory, phase change memory, or multi-state memory, in which each memory cell has more than two states. The storage device 284 may include an optical storage drive, such as a DVD drive, and/or the HDD.

Referring now to FIG. 6F, the teachings of the disclosure can be implemented in a hard disk drive (HDD) used as a storage device 293 in a media player 289. The media player 289 may include a media player control module 290, a power supply 291, memory 292, the storage device 293, a WLAN interface 294 and associated antenna 295, and an external interface 299.

The media player control module 290 may receive input signals from the WLAN interface 294 and/or the external interface 299. The external interface 299 may include USB, infrared, and/or Ethernet. The input signals may include compressed audio and/or video, and may be compliant with the MP3 format. Additionally, the media player control module 290 may receive input from a user input 296 such as a keypad, touchpad, or individual buttons. The media player control module 290 may process input signals, including encoding, decoding, filtering, and/or formatting, and generate output signals.

The media player control module 290 may output audio signals to an audio output 297 and video signals to a display 298. The audio output 297 may include a speaker and/or an output jack. The display 298 may present a graphical user interface, which may include menus, icons, etc. The power supply 291 provides power to the components of the media player 289. Memory 292 may include random access memory (RAM) and/or nonvolatile memory such as flash memory, phase change memory, or multi-state memory, in which each memory cell has more than two states. The storage device 293 may include an optical storage drive, such as a DVD drive, and/or the HDD.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A read-channel module comprising:
a variable-gain amplifier module configured to amplify a signal based on a variable gain;
an analog-to-digital converter module configured to generate a sample based on the amplified signal;
an automatic gain control module configured to control the variable gain of the variable-gain amplifier module;
a gain adjusting module configured to
in response to an amplitude of the sample being less than or equal to a first predetermined threshold, generate a first gain for the automatic gain control module., wherein the automatic gain control module is configured to increase the variable gain of the variable-gain amplifier module based on the first gain, and
in response to the amplitude of the sample being greater than or equal to a second predetermined threshold, generate a second gain for the automatic gain control module, wherein the automatic gain control module is configured to decrease the variable gain of the variable-gain amplifier module based on the second gain;
a zero phase start module configured to generate a phase information from the sample in response to the amplitude of the sample being (i) greater than or equal to the first predetermined threshold and (ii) less than or equal to the second predetermined threshold; and
an amplitude measuring module configured to
measure the amplitude of the sample, and
disable the zero phase start module in response to the amplitude of the sample being (i) less than or equal to the first predetermined threshold and (ii) greater than or equal to the second predetermined threshold.

2. The read-channel module of claim 1, further comprising a timing recovery module configured to determine when to recover data from the sample based on the phase information.

3. A read-channel module comprising:
a variable-gain amplifier module configured to amplify a signal based on a variable gain;
an analog-to-digital converter module configured to generate a sample based on the amplified signal;
an automatic gain control module configured to control the variable gain of the variable-gain amplifier module; and
a gain adjusting module configured to
in response to an amplitude of the sample being less than or equal to a first predetermined threshold, generate a first gain for the automatic gain control module, wherein the automatic gain control module is configured to increase the variable gain of the variable-gain amplifier module based on the first gain, in response to the amplitude of the sample being greater than or equal to a second predetermined threshold, generate a second gain for the automatic gain control module, wherein the automatic gain control module is configured to decrease the variable gain of the variable-gain amplifier module based on the second gain, receive feedback of a present gain of the automatic gain control module, and generate the first gain and the second gain by (i) multiplying the present gain of the automatic gain control module by a predetermined multiplier or (ii) adding a predetermined offset to the present gain of the automatic gain control module.

4. The read-channel module of claim 3, further comprising a zero phase start module configured to generate a phase information from the sample in response to the amplitude of the sample being (i) greater than or equal to the first predetermined threshold and (ii) less than or equal to the second predetermined threshold.

5. The read-channel module of claim 4, further comprising a timing recovery module configured to determine when to recover data from the sample based on the phase information.

6. A method comprising:
amplifying a signal and generating an amplified signal using a variable-gain amplifier module having a variable gain;
generating a sample based on the amplified signal using an analog-to-digital converter module;
controlling the variable gain of the variable-gain amplifier module using an automatic gain control module;
in response to an amplitude of the sample being less than or equal to a first predetermined threshold,
  generating a first gain for the automatic gain control module, and
  increasing the variable gain of the variable-gain amplifier module based on the first gain of the automatic gain control module;
in response to the amplitude of the sample being greater than or equal to a second predetermined threshold,
  generating a second gain for the automatic gain control module, and
  decreasing the variable gain of the variable-gain amplifier module based on the second gain of the automatic gain control module;
generating a phase information from the sample in response to the amplitude of the sample being (i) greater than or equal to the first predetermined threshold and (ii) less than or equal to the second predetermined threshold; and
suspending determination of the phase information in response to the amplitude of the sample being (i) less than or equal to the first predetermined threshold and (ii) greater than or equal to the second predetermined threshold.

7. The method of claim 6, further comprising determining when to recover data from the sample based on the phase information.

8. A method comprising:
amplifying a signal and generating an amplified signal using a variable-gain amplifier module having a variable gain;
generating a sample based on the amplified signal using an analog-to-digital converter module;
controlling the variable gain of the variable-gain amplifier module using an automatic gain control module;
in response to an amplitude of the sample being less than or equal to a first predetermined threshold,
  generating a first gain for the automatic gain control module, and
  increasing the variable gain of the variable-gain amplifier module based on the first gain of the automatic gain control module;
in response to the amplitude of the sample being greater than or equal to a second predetermined threshold,
  generating a second gain for the automatic gain control module, and
  decreasing the variable gain of the variable-gain amplifier module based on the second gain of the automatic gain control module; and
generating the first gain and the second gain by (i) multiplying a present gain of the automatic gain control module by a predetermined multiplier or (ii) adding a predetermined offset to the present gain of the automatic gain control module.

9. The method of claim 8, further comprising generating a phase information from the sample in response to the amplitude of the sample being (i) greater than or equal to the first predetermined threshold and (ii) less than or equal to the second predetermined threshold.

10. The method of claim 9, further comprising determining when to recover data from the sample based on the phase information.

* * * * *